United States Patent
Harteneck

(10) Patent No.: US 9,031,513 B2
(45) Date of Patent: May 12, 2015

(54) TEST DEVICE FOR TESTING THE TRANSMISSION QUALITY OF A RADIO DEVICE

(75) Inventor: Moritz Harteneck, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 323 days.

(21) Appl. No.: 12/937,225

(22) PCT Filed: Mar. 9, 2009

(86) PCT No.: PCT/EP2009/001673
§ 371 (c)(1),
(2), (4) Date: Nov. 18, 2010

(87) PCT Pub. No.: WO2009/124626
PCT Pub. Date: Oct. 15, 2009

(65) Prior Publication Data
US 2011/0053516 A1 Mar. 3, 2011

(30) Foreign Application Priority Data
Apr. 11, 2008 (DE) .......................... 10 2008 018 385

(51) Int. Cl.
*H04B 17/00* (2006.01)
*H04L 1/24* (2006.01)
(Continued)

(52) U.S. Cl.
CPC .......... *H04B 17/0095* (2013.01); *H04B 17/002* (2013.01); *H04B 17/0042* (2013.01); *H04L 1/0026* (2013.01); *H04L 1/0028* (2013.01); *H04L 1/243* (2013.01); *H04L 27/2601* (2013.01)

(58) Field of Classification Search
USPC ............. 455/450, 452.2, 455, 509, 513, 63.1, 455/67.11, 67.13, 67.7, 67.14, 69, 115.2
See application file for complete search history.

(56) References Cited

U.S. PATENT DOCUMENTS 5,596,570 A * 1/1997 Soliman ......................... 370/252
5,752,167 A * 5/1998 Kitayoshi .................. 455/67.11
(Continued)

FOREIGN PATENT DOCUMENTS

DE   10 2005 016 585 A1   9/2006
EP        1 095 480 B1      7/2005
(Continued)

OTHER PUBLICATIONS

International Search Report mailed Jul. 30, 2009, issued in corresponding International Application No. PCT/EP2009/001673, filed Mar. 9, 2009, 3 pages.
(Continued)

*Primary Examiner* — Ping Hsieh
(74) *Attorney, Agent, or Firm* — Christensen O'Connor Johnson Kindness PLLC

(57) ABSTRACT

The invention relates to a test device for testing the transmission quality of radio devices by integrating a noise generating device in the transmission chain of the test device. To this end, data to be transmitted are imaged on individual partial data streams modulated onto signals associated with the partial data streams and having different carrier frequencies. At this point in the transmission chain, a noise proportion for at least a part of the signals is added to one signal each of a carrier frequency, in order to allow frequency-selective control of the noise proportions added to the signals of the carrier frequencies. The resulting noisy signals and non-noisy signals of the carrier frequencies are transmitted by a transmission device, and a response signal sent back by a radio device to be tested is received by a receiving device. An analysis device evaluates the received response signal.

7 Claims, 2 Drawing Sheets

(51) Int. Cl.
*H04L 1/00* (2006.01)
*H04L 27/26* (2006.01)

(56) References Cited

U.S. PATENT DOCUMENTS

| | | | |
|---|---|---|---|
| 2003/0194979 A1* | 10/2003 | Richards et al. | 455/216 |
| 2003/0236089 A1* | 12/2003 | Beyme et al. | 455/423 |
| 2005/0032514 A1* | 2/2005 | Sadri et al. | 455/423 |
| 2008/0056340 A1* | 3/2008 | Foegelle | 375/224 |
| 2008/0214183 A1 | 9/2008 | Braun | |

FOREIGN PATENT DOCUMENTS

| | | | | |
|---|---|---|---|---|
| GB | 2 440 190 A | | 1/2008 | |
| GB | 2440190 A | * | 1/2008 | H04W 24/06 |
| WO | 00/67419 A1 | | 11/2000 | |
| WO | 2007/107637 A1 | | 9/2007 | |

OTHER PUBLICATIONS

Harteneck, M., "LTE—der 'Physical Layer' auf dem Prüfstand," © 2009 WEKA Fachmedien GmbH, <http://www.electroniknet.de/home/messentesten/fachwissen/uebersicht/l/hf-messgeraete/lte-der-physical-layer-auf-dem-pruefstand/druckversion/> [retrieved Jul. 17, 2009], 3 pages.

Motorola, "Update of TS36.213 According to Changes Listed in Cover Sheet," 3GPP TSG-RAN WG1 Meeting #52, Sorrento, Italy, Feb. 11-15, 2008, Report R1-081158, Draft Change Request 36.213 CR 0002, Aug. 8, 2008, 27 pages.

English Translation of International Preliminary Report on Patentability mailed Jan. 27, 2011, in corresponding International Application No. PCT/EP2009/001673, filed Mar. 9, 2009.

\* cited by examiner

TEST DEVICE FOR TESTING THE TRANSMISSION QUALITY OF A RADIO DEVICE

The invention relates to a test device for testing a radio device.

Constantly increasing demands on radio devices have led to and continue to lead to a rapid further development in radio standards, that is, transmission standards for radio devices. In order to obtain ever-increasing data rates and ever-smaller error rates, radio standards are becoming increasingly complex. Accordingly, the test devices for testing transmissions from the radio devices are also becoming increasingly complex.

One important development was and is the simultaneous transmission of several channels. Accordingly, in mobile radio systems of the third generation, such as UMTS, several channels are transmitted simultaneously through coding. Mobile radio systems of the fourth generation (LTE, Long Term Evolution) use, inter alia, orthogonal frequency multiplex methods (OFDM/OFDMA), Orthogonal Frequency Division Multiplexing/Orthogonal Frequency Division Multiple Access) for this purpose. In this context, the various channels are transmitted in parallel on numerous, mutually orthogonal carrier frequencies within a fixed bandwidth. As a result of the orthogonality of the carrier frequencies, a large number of carrier frequencies disposed in the order of magnitude of a thousand, which, however, also overlap strongly, can be achieved.

A further development was and is the possibility of matching the transmission parameters, such as transmission power, modulation type, coding and, especially in the case of OFDM, the carrier frequencies used, in a flexible manner to the conditions of the radio transmission in order to optimise the transmission in the sense of a maximum efficiency transmission, that is to say, an error-free and simultaneously low-power transmission. However, a reliable error recognition coded according to transmission parameters is indispensable for this purpose. In order to allow a consistent error recognition, checksums for the recognition of errors are transmitted in the transmission blocks alongside the payload data.

The German published specification DE 10 2005 016 585 A1 discloses a test device for testing mobile-radio devices of the third generation, which takes into consideration the increasing complexity of the transmission standards above all with reference to increasing flexibility and parallelism. In this context, various partial data streams are generated in each case with different sets of transmission parameters and transmitted in successive time slots. The device under test evaluates the received transmission blocks of these partial data streams and, in the case of a correct transmission, transmits a positive signal to the test device, or in the case of an incorrect transmission transmits a negative signal to the test device. By counting the negative signals with reference to all signals per partial data stream, the test device can now provide an individual error rate per set of transmission parameters.

However, this method is not suitable for testing mobile-radio devices of the fourth generation which use OFDM. The radio transmission of signals is disturbed by many frequency-dependent effects on the transmission path, such as fading, interference through reflections, absorptions, diffraction effects and so on. The frequency dependency of these disturbances is exploited, for example, by LTE, in order to seek the qualitatively best carrier frequencies for the communication with the radio device and accordingly to find an optimal set of carrier frequencies for the transmission. However, the German published specification does not provide a method for individual testing of different frequencies.

For testing real signal conditions, the frequency-dependent disturbances in the transmission must be simulated. It is known that disturbances in radio transmissions can be simulated through an external addition of noise, generally white noise. In this context, the strength of the disturbance can be varied with the variance of the noise. However, white noise contains all frequencies in equal proportions and is therefore not suitable for simulating frequency-dependent disturbances. Above all, if the strength of the noise per carrier signal is to be variable.

To produce a noising, which has a given strength in given frequency ranges is technically difficult to realise and above all expensive. For this purpose, a complicated sequential connection of high and low pass filters and a cost-intensive superposition of the frequency-specific noise processes generated in this manner are required. An additional disadvantage of this method is that, as a result of the finite edge steepness of the filters and the overlapping of the carrier frequencies, the very narrow frequency range of an individual carrier frequency cannot be produced with sufficient accuracy.

It is the object of the invention to remove the disadvantages of the prior art described above. The object of the invention is to provide a test device, which can simulate the frequency-dependent disturbances in the transmission signal and can therefore test the selection of a number of qualitatively best carrier frequencies through a receiving radio device.

With the test device according to the invention, several partial data streams are initially generated from the information to be transmitted, that is to say, from the data to be transmitted, through an imaging specification established in the imaging device. These partial data streams are modulated in order to generate a parallel transmission of the information in parallel signals on different carrier frequencies.

So long as the individual signals of the carrier frequencies (sub-carrier) are still present in the unmixed form, a noise-generating device selectively adds one noise component respectively to each signal of a carrier frequency for at least some of the signals in order to simulate frequency-dependent disturbances. A transmission device transmits the resulting signals of the various carrier frequencies, that is, the signals of the individual carrier frequencies plus the noise component added in each case to these signals. A receiving device receives a response signal sent back from a radio device under test, which is evaluated by an analysis device.

In the case of the test device according to the invention, it is advantageous that the device under test is influenced by frequency-dependent disturbances, such as frequently occur within our field. Through the selective addition of the noise components to the signals, which are still present coded according to their carrier frequency, the frequency-dependent noise can be simulated in a simple and cost-favourable manner without complex filters in order to implement the generation of frequency-dependent noise.

The dependent claims relate to advantageous further developments of the test device according to the invention.

In particular, it is advantageous for the analysis device to extract and evaluate the quality of the transmission from the response signal. Accordingly, it is possible to check whether the device under test returns the correct, that is, the most efficient carrier signals in the response signal to the test device. A more realistic estimation of the error rate and respectively the quality of the radio device is possible as a result.

Furthermore, it is advantageous to test with the test device according to the invention primarily radio devices, which use OFDM as the transmission technology, because OFDM places a very stringent demand on devices for the frequency-selective testing of radio devices.

The invention relates to all test devices for radio devices, which use frequency multiplex methods and especially those, which use OFDM. Accordingly, the area of application is directed primarily towards mobile telephony and all devices, which use transmission standards for mobile radio, such as LTE. However, other radio devices, which support OFDM, for example, in the field of wireless local area networks such as WiMax, in the field of personal area networks such as WiMedia/Ecma-368 standard or in the field of terrestrial transmission of digital television and radio such as DVB-T, DVB-H, T-DMB and EUREKA 147 DAB, Digital Radio Mondiale, HD-Radio, T-DMB can be tested with the test device according to the invention.

An exemplary embodiment of the invention is described in greater detail below with reference to the drawings. The drawings are as follows.

Figure 1:
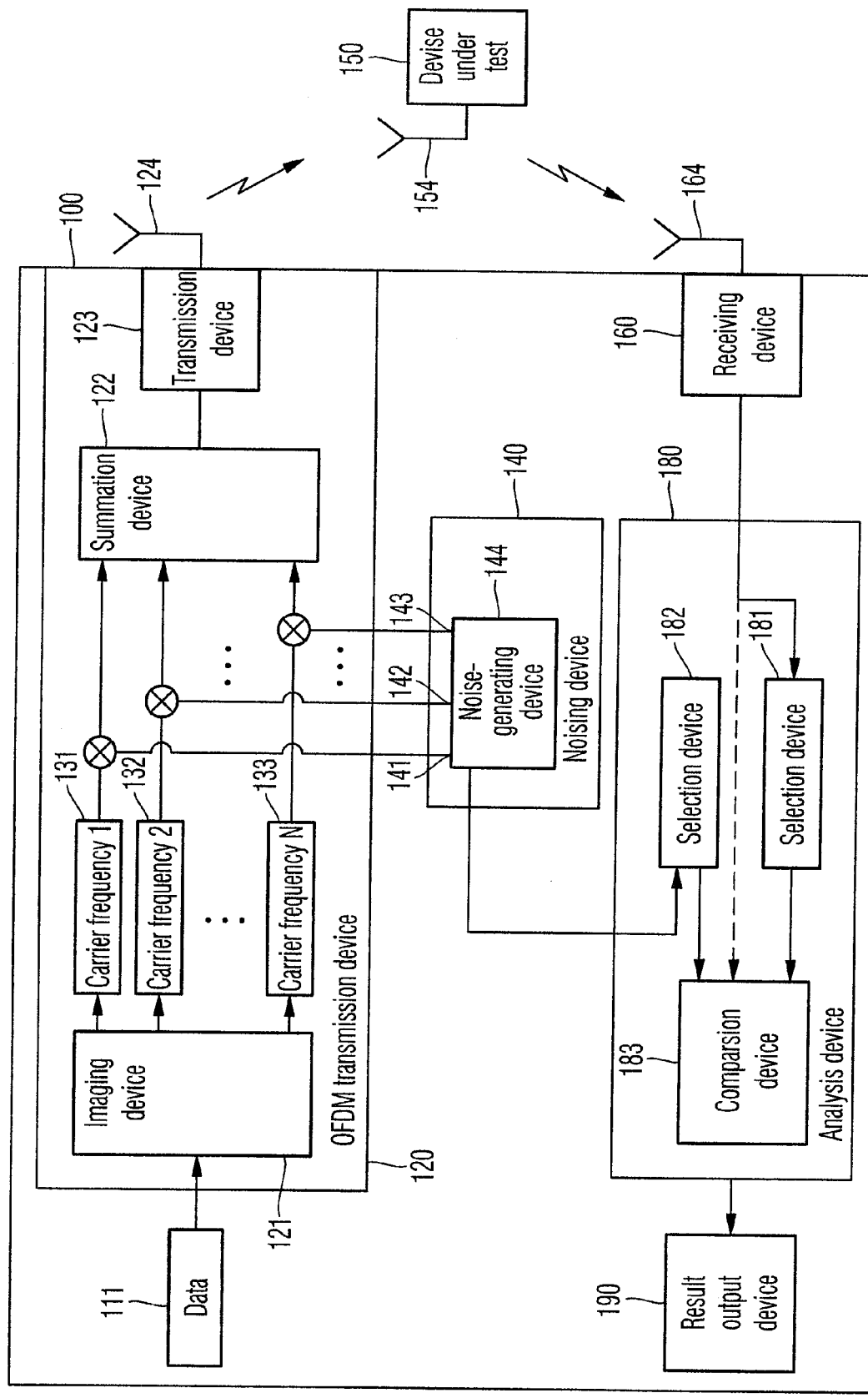
FIG. 1 shows an exemplary embodiment of the test device according to the invention.

FIG. 1 shows a possible exemplary embodiment of the test device according to the invention. The test device 100 comprises an OFDM transmission device 120, a noise-generating device 140, a receiving device 160, an analysis device 180 and a result-output device 190.

In addition to the test device 100, a mobile-radio device 150 under test is illustrated as a radio device, which can receive signals from the test device 100 and transmit a response signal. A mobile-radio device 150 here comprises all mobile-radio devices, which use frequency-multiplex methods (FDM/FDMA) and in particular, orthogonal frequency-multiplex methods (OFDM/OFDMA) and their further developments for the transmission.

In the following section, a possible exemplary embodiment of the test device according to the invention is described:

Initially, the test device 100 generates data 111 to be transmitted. The data 111 can be generated by a pseudo-random generator or may also comprise a fixed test-data record. As an alternative, the data can also be imported via an input port into the test device 100. The data are present in the form of a data stream, that is, a time sequence of bits. This will also be referred to below as serial data.

The OFDM transmission device 120 parallelises the data 111 and in this manner generates partial data streams. The test device 100 transmits these on various orthogonal carrier frequencies. For this purpose, the serial data 111 are input into the imaging device 121 and subdivided there into N parallel, partial data streams, which once again each comprise a sequence of bits. This can be implemented, for example, by breaking down the serial data stream 111 into data blocks of length L. As an alternative, as in the case of interleaving, it is also possible to distribute adjacent bits in the serial data stream 111 to the N parallel data streams in order to avoid errors in causally associated data blocks. The N parallelised data streams are modulated by means of a digital modulation method such as QPSK (Quadrature Phase Shift Keying), QAM (Quadrature Amplitude Modulation), and so on, onto the N carrier frequencies. As an alternative, different modulation methods can also be used for different carrier frequencies in order to take into consideration the different transmission quality. The imaging device 121 sends the N carrier signals 131, 132, . . . , 133 modulated with the baseband signals of the partial data streams to the summation device 122, wherein a carrier signal 131, 132, . . . , 133, which is the signal modulated to a carrier frequency f1, which comprises the corresponding parallelised, partial data stream translated by means of the corresponding modulation method.

In order to simulate a realistic signal transmission, that is to say, a realistic transmission of all carrier signals 131, 132, . . . , 133 for the test of the mobile-radio device 150, the individual carrier signals 131, 132, 133 are disturbed with noise. In this context, a noise-generating device 140 can provide each individual carrier signal 131, 132, . . . , 133 individually with a noise 141, 142, . . . , 143 of a given strength. Through the frequency-selective addition of noise components of different strength to the not yet mixed or superimposed carrier signals, the different transmission quality or its disturbances of different carrier signals is simulated. The number of noisy carrier frequencies can be disposed between 1 and the number N of the carrier frequencies.

Each noise component 141, 142, . . . , 143, which is added to the respective carrier signal 131, 132, 133, is generated in the noise-generating device. As an alternative, each noise component 141, 142, . . . , 143 for the respective carrier signal 131, 132, . . . , 133 can be input into the noise-generating device through a port from outside the test device 100. The information, regarding which carrier signals are noisy and how strongly these are noised, can be stored in a fixed manner, for example, in the noise-generating device, or alternatively can be input through a port from outside the test device 100. This information is sent to the analysis device 180 for a subsequent use.

The carrier signals resulting from the selective noise generation of the carrier signals 131, 132, . . . , 133 are combined in the summation device 122 to form a signal. In this context, the individual, resulting carrier signals, which are so far present in a frequency presentation in Fourier space, are transformed in an inverse Fourier transform into the time domain. This is generally implemented with the algorithm of the IFFT (Inverse Fast Fourier Transform). Following this, the resulting carrier signals are added in the time domain to form a transmission signal and sent to the transmission device 123. The transmission device 123 comprises an antenna 124, with which the transmission signal, comprising the resulting carrier signals transformed in the time domain and added, is transmitted. As an alternative, the transmission device can provide several antennas 124 and transmit the individual resulting carrier signals in the time domain or also partial sums of these.

The mobile-radio device 150 under test receives the transmitted signal via an antenna 154. After the extraction of the individual carrier signals 131, 132, . . . , 133 from the transmission signal, a response signal corresponding to the standard used is produced and sent back to the receiving device 160 of the test device 100. In the case of OFDM, the response signal must contain information on the quality of the data transmitted per carrier signal, that is to say, on the transmission quality per carrier frequency. The information on the quality can be present, for example, in the form of a CQI (Channel Quality Indicator). On the basis of a signal to noise ratio (SNR; signal to noise ratio), the CQI is determined, wherein pilot signals of a mobile radio signal are used for the estimation of the SNR. This is implemented in a per se known manner, for which reason a detailed description is not required. This quality information is sent back again to the test device 100 with a response signal.

The test device 100 receives the response signal with the receiving device 160 via an antenna 164. The antenna 164 can be identical to the antenna 124 of the transmission device; conversely, the receiving device 160 can also contain several antennas, if it is a so-called multi-antenna system (MIMO, Multiple Input Multiple Output). The same, of course, also applies to the mobile-radio device 150. A device, which is not illustrated, digitizes the transmitted data from the response signal and sends these to the analysis device 180.

The response signal is analysed in the analysis device 180, and a test result is achieved by means of a target/actual comparison. In a first selection device 181, an adjustable number of qualitatively best channels or respectively their carrier frequencies is selected on the basis of the information from the response signal and stored, for example, with a channel-quality index (CQI, Channel Quality Index). The CQI allows a list of a number k of channels or of carrier frequencies to be prepared, wherein the carrier frequencies contained are sorted starting with the qualitatively best transmitted carrier frequency (highest CQI) to a qualitatively k-th best transmitted carrier frequency in descending order ($CQI_k$). As an alternative, it is of course conceivable that the k best carrier frequencies are stored in the reverse order or not sorted. A number k here means a number between 1 and the number N of carrier frequencies. The information on the selected k best carrier frequencies, for example, the CQI, is sent to the comparison device 183. The first selection device 181 can also be contained in the mobile-radio device, which then directly prepares a list on the basis of the CQIs and sends it to the test device 100. In the latter case, the receiving unit 160 sends the digitised response signal directly to the comparison device 183 (illustrated by a dotted-line arrow) instead of to the selection device 181.

In the same manner as the first selection device 181, a second selection device 182 calculates the k qualitatively best carrier frequencies, that is to say, the respective CQI, now on the basis of the information for the noise component per carrier frequency originating from the noise-generating device 140. These CQIs are referred to below as target CQIs, because they have been calculated from the information, with which the frequency-dependent noise per carrier frequency was simulated, and can accordingly determine the k qualitatively best carrier frequencies from the k least noisy carrier frequencies without error. If different transmission parameters are used for the various carrier frequencies, this must be taken into consideration in the calculation of the target CQIs. Accordingly, for example, the use of a more error-susceptible 64-QAM modulation in the lowest-noise carrier frequency can lead to a relatively higher error rate than a relatively safer QPSK modulation in a noisier carrier frequency. After the correct calculation of the target CQIs, the target CQIs also input into the comparison device 183.

The comparison device 183 now compares the target CQIs with the respective CQIs from the response signal. The result of this comparison can comprise a "correct"/"incorrect" signal or, in the case of "incorrect", the deviation between the target CQIs and the respective CQIs of the response signal can be specified in greater detail. In this context, the number of deviations and/or the quality of the individual deviations would be conceivable, such as, for example, whether only the next neighbour was used instead of the correct carrier.

The result is then sent to a result-output device, where it is displayed, for example, to a user on a screen, or where it is sent, for example, by a port to a computer for further evaluation.

Figure 2:
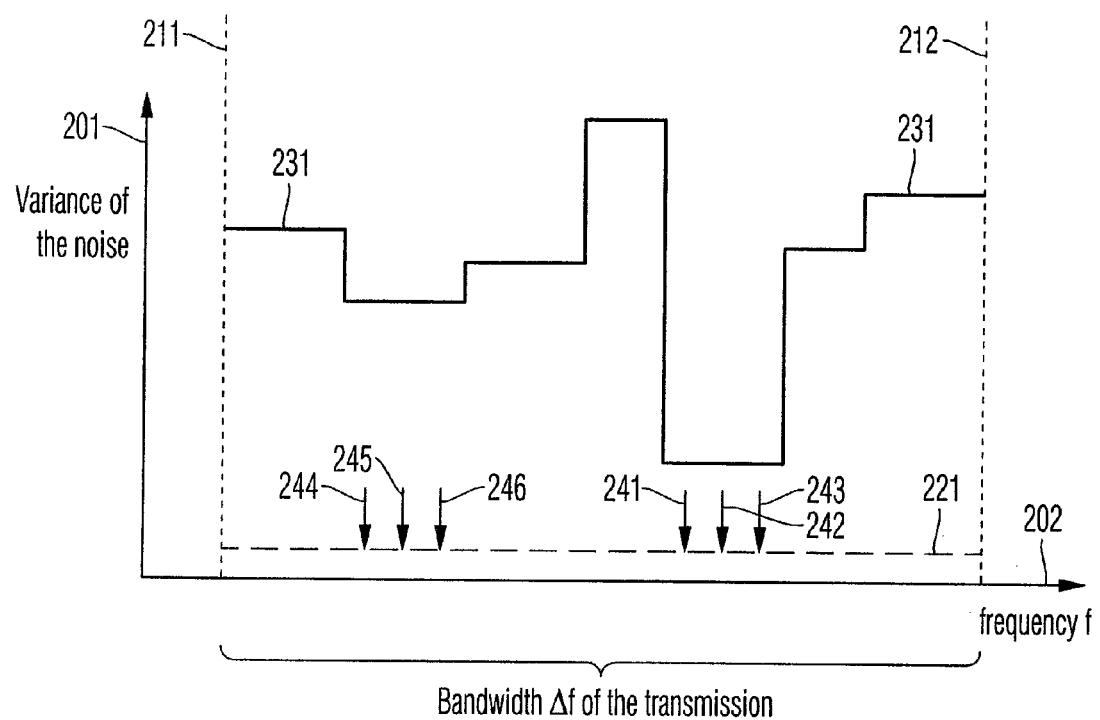
FIG. 2 shows an exemplary embodiment of a frequency-selective noise pattern.

FIG. 2 shows an exemplary pattern 231 of the frequency-dependent noise as it is added to the carrier signals by the noise-generating device 140. In this context, the variance of the noise 201 is plotted against the frequency f 202. The bandwidth Δf of the transmission is marked by the lower 211 and upper 212 frequency limit. The bandwidth Δf is once again subdivided into individual carrier frequencies or carrier frequency ranges 221, which are each disturbed with a respective noise component. Only a small number of carrier frequencies is presented here. In the case of OFDM transmissions, the number of carrier frequencies is within an order of magnitude of 1000.

The pattern 231 or respectively the variance of the noise per frequency is equal to zero outside the bandwidth Δf of the transmission. The curve, or here, the step function 231 shows the respective noise component of each carrier signal 221 for at least some of the carrier signals. In this case, all carrier signals 221 have been disturbed with a noise component. Since the orthogonal weighting functions of the carrier frequencies overlap and are not constant, 231 is in reality not an exact step function. The step function 231 is an approximated, idealised presentation of the noise components per carrier frequency.

In the case of the use of the noise pattern 231 in the noise-generating device 240, the selection device 241 would select the carrier frequencies, which are marked with the arrows 241, 242, 243, as the qualitatively best, because they provide the smallest noise component, that is, the smallest variance. These would be followed by the carrier frequencies marked with the arrows 244, 245, 246. This can be continued, until the k best carrier frequencies have been selected. The respective target CQI can be calculated in this manner. In the example described, it is assumed that the transmission parameters such as transmission power, modulation type and so on are selected to be the same for all carrier frequencies, in order to achieve identical conditions for all carrier frequencies for the test. The test method can be expanded through the use of different transmission parameters for different carrier frequencies, wherein this must be taken into consideration in the calculation of the target CQI, because, for example, a PSK modulation generates substantially less transmission errors than a 64-QAM modulation.

The invention is not restricted to the exemplary embodiment presented, on the contrary, individual features can also be advantageously combined with one another.

The invention claimed is:

1. A test device for testing a radio device, comprising:
   an imaging device configured to image information to be transmitted onto various signals differing with regard to the carrier frequency;
   a noise-generating device configured for the addition of one frequency-dependent noise component to a signal of a carrier frequency, wherein a step function is a presentation of the frequency-dependent noise components per carrier frequency, and wherein a certain noise component corresponds to a certain carrier frequency, and this certain noise component is added to the certain corresponding carrier frequency;
   a transmission device configured to transmit the resulting noisy signals and non-noisy signals of the various carrier frequencies to the radio device;
   a receiving device configured to receive a response signal sent back by the radio device in response; and
   an analysis device configured to evaluate the response signal, wherein the analysis device comprises a comparison device configured to compare the qualitatively best carrier frequencies extracted from the response signal with anticipated, qualitatively best carrier frequencies, and wherein the anticipated, qualitatively best carrier frequencies are determined from the frequency-dependent noise components added to the carrier signals.

2. The test device according to claim 1, wherein the analysis device is set up in such a manner that it extracts the quality of the transmission per carrier frequency from the response signal.

3. The test device according to claim 1, wherein the analysis device comprises a selection device for selection a number of qualitatively best carrier frequencies.

4. The test device according to claim 1, wherein the imaging device is set up in such a manner that it images information to be transmitted onto various signals differing with regard to the carrier frequency, wherein the carrier frequencies of the signals are orthogonal relative to one another.

5. The test device according to claim 1, wherein a summation device contained in the test device adds together the signals of the various carrier frequencies before the transmission.

6. The test device according to claim 5, wherein the summation device transforms the resulting noisy and non-noisy signals of the various carrier frequencies with an inverse Fourier transform into the time domain and adds the results of these transformations.

7. The test device according to claim 1, wherein the frequency-dependent noise component added in each case to a respective signal of a carrier frequency is a white noise.

\* \* \* \* \*